United States Patent [19]

Yada et al.

[11] Patent Number: 5,085,902
[45] Date of Patent: Feb. 4, 1992

[54] END STRUCTURE OF A MOLDING FOR USE WITH AN AUTOMOBILE AND PROCESS FOR FINISHING END PORTIONS OF THE MOLDING

[75] Inventors: Yukihiko Yada, Nagoya; Kazuo Shiiya, Kariya, both of Japan

[73] Assignee: Tokai Kogyo Kabushiki Kaisha, Obu, Japan

[21] Appl. No.: 501,540

[22] Filed: Mar. 30, 1990

[30] Foreign Application Priority Data

Apr. 7, 1989 [JP] Japan ................................. 1-88344

[51] Int. Cl.$^5$ ............................................. B60R 13/04
[52] U.S. Cl. ......................................... 428/31; 156/201; 156/244.11; 296/93; 428/122; 428/358
[58] Field of Search .......................... 428/122, 31, 358; 52/208, 400; 296/93; 156/201, 244.11

[56] References Cited

U.S. PATENT DOCUMENTS

| | | | |
|---|---|---|---|
| 4,112,623 | 9/1978 | McPherson | 428/122 X |
| 4,113,295 | 9/1978 | Wenrick | 428/31 X |
| 4,441,755 | 4/1984 | Endo et al. | 428/122 X |
| 4,853,263 | 8/1989 | Nagata et al. | 428/31 |
| 4,884,380 | 12/1989 | Yada et al. | 428/122 X |
| 5,035,459 | 7/1991 | Yada | 296/93 |
| 5,037,681 | 8/1991 | Yada et al. | 428/31 |
| 5,039,157 | 8/1991 | Yada | 296/93 |
| 5,044,684 | 9/1991 | Yada | 296/93 |

Primary Examiner—Henry F. Epstein
Attorney, Agent, or Firm—Dennison, Meserole, Pollack & Scheiner

[57] ABSTRACT

In a molding for use with an automobile comprising an elongated, self-supporting metal strip folded along longitudinal edges thereof to form a structure with a defined height component, a finishing film bonded to the metal strip so as to cover an outwardly disposed surface thereof and the folded edges, and resilient seal members bonded to the folded edges, an end structure is formed by cutting away the folded edges of adjacent opposite lateral ends of the molding, folding the metal strip and finishing film inwardly at each of the opposite lateral ends to form closed end portions having substantially the defined height component, and bonding an end resilient seal member to each of the closed end portions, the end seal members continuing the resilient seal members.

5 Claims, 9 Drawing Sheets

END STRUCTURE OF A MOLDING FOR USE WITH AN AUTOMOBILE AND PROCESS FOR FINISHING END PORTIONS OF THE MOLDING

BACKGROUND OF THE INVENTION

The present invention relates to an ornamental end structure of a molding for use with an automobile and to a process for finishing end portions of the molding, and more particularly, the invention relates to an end structure of a molding which does not include end caps and to a process for finishing end portions of the molding to form such an end structure.

FIG. 24 shows one of prior art roof moldings for use with an automobile. As shown therein, a roof molding 31 of an automobile comprises a metal strip or a core metal 42 folded unsymmetrically in cross section, a resin layer 32 formed of a synthetic resin such as polyvinyl chloride (PVC) which is bonded to the outer surface of the metal strip 42 with an adhesive material 50 and is integrally provided with resilient lips 33 for sealing engagement with side walls of a fitting groove 35 formed on an automobile roof, and a coating layer 34 coated on the upper surface of the resin layer 32. The transverse end portions of the roof molding 31 are bonded with end caps 36 formed of a synthetic resin, as shown in FIG. 26.

A problem usually associated with the molding in the prior art is that a seam or joint line is produced between the roof molding and the end cap to cause undesirable awkward appearance of the molding and that the end cap tends to be disengaged from the molding with aging.

SUMMARY OF THE INVENTION

It is an object of the invention to provide an upgraded end structure of a molding for use with an automobile, that is, to provide an end structure of a molding in which the problem associated with the conventional end structure of a molding is eliminated.

It is another object of the invention to provide a finishing process suitable for producing the end structure of the molding.

According to the present invention, there is provided an end structure of a molding for use with an automobile comprising a metal strip folded along the longitudinal edge potions thereof; a finishing film bonded to the metal strip so as to cover the upper surface and the folded portion of the metal strip, the finishing film comprising a flexible resin film and a flexible transparent resin layer provided on the outer surface of the resin layer; and resilient seal members bonded to the longitudinal edge portions of the metal strip, wherein the opposite end portions of the molding are inwardly folded after the longitudinal edges of the molding are partially cut away, and wherein the folded end portions are provided with resilient seal members.

Also, according to the present invention, there is provided a process for finishing the opposite end portions of a molding for use with an automobile comprising a metal strip folded along the longitudinal edges thereof; a finishing film bonded to the metal strip so as to cover the upper surface and the folded portion of the metal strip, the finishing film comprising a flexible resin film and a flexible transparent resin layer provided on the outer surface of the resin layer; and resilient seal members bonded to the longitudinal edges of the metal strip, which comprises the steps of partially cutting away the longitudinal edges of the molding; inwardly folding the opposite end portions of the molding; varnishing an adhesive material to the folded opposite end portions; and forming a resilient seal member to each of the folded opposite end portions.

An important feature of the present invention is that the opposite end portions of the molding are not provided with end caps, and therefore, seams are not formed on the end protions of the molding, providing a good appearance and durability of the molding.

Another feature of the invention is that it is provided with a finishing process of the end portions of the molding which eliminates the problem associated with the conventional end structure of the molding.

The present invention will become more fully apparent from the claims and the description as it proceeds in connection with the drawings.

DETAILED DESCRIPTION OF THE PREFERRED EMBODIMENTS

Figure 1:
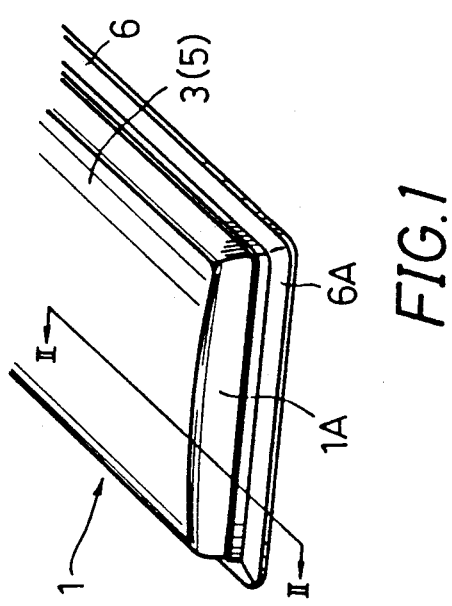
FIG. 1 is a perspective view of an end portion of a molding according to a first embodiment of the present invention.
Figure 2:
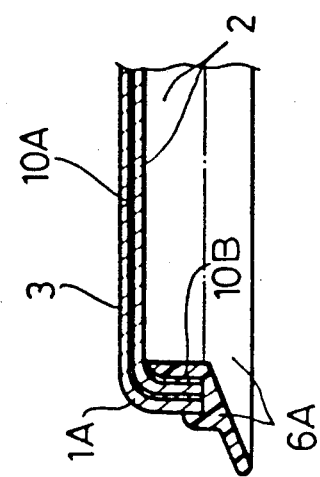
FIG. 2 is a sectional view taken along the line II—II of FIG. 1.

Referring now to FIGS. 1 to 14, shown therein is a molding 1 according to a first embodiment of the invention which is applicable to a roof of an automobile. For convenience in terminology, the molding 1 for use in automobile roofs will be called the roof molding. As shown in FIGS. 1 and 2, the roof molding 1 comprises a metal strip 2 folded unsymmetrically in cross section, a flexible finishing film 3 bonded to the metal strip 2 so as to cover the upper flat surface and the folded surface of the metal strip 2, and resilient seal members or resilient lips 6 provided on and extending along the longitudinal edges of the metal strip 2. An end portion 1A of the roof molding 1 is inwardly folded after the longitudinal edge portions of the roof molding 1 are partially cut away to form notches 1B (FIG. 10) and is provided with a resilient seal member 6A which is integrally bonded to the resilient seal member 6.

Figure 5:
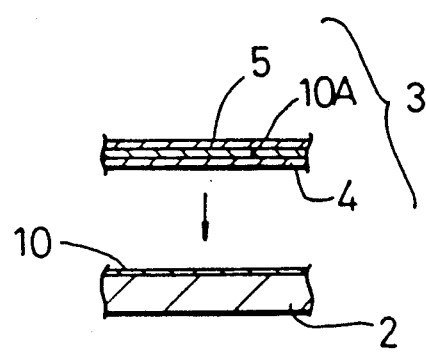
FIG. 5 is a sectional view of the finishing film and the metal strip before bonding the finishing film to the metal strip.

As shown in FIG. 5, the flexible finishing film 3 comprises a colored flexible resin film 4 and a flexible transparent resin layer 5 adhered to the outer surface of the resin film 4 with an adhesive material 10A. The resin film 4 is formed typically of PVC and is coated with a silver painting material. The adhesive material 10A and the transparent resin layer 5 is formed typically of acrylic resin and fluorocarbon resin, respectively.

Figure 3:
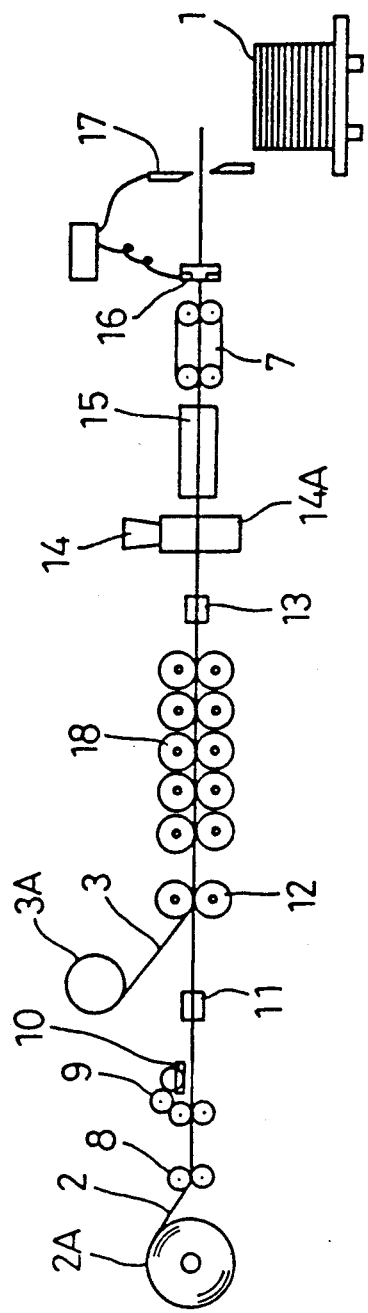
FIG. 3 is a schematic view of the production line to manufacture the molding.
Figure 4:
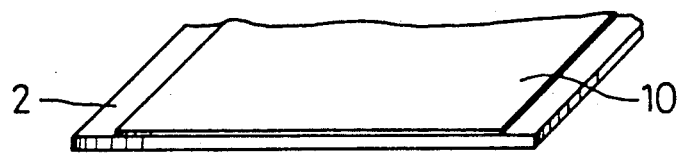
FIG. 4 is a perspective view of a metal strip varnished with the adhesive material thereon.
Figure 6:
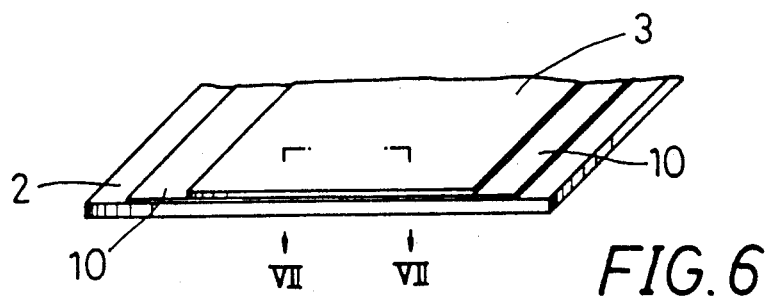
FIG. 6 is a perspective view of the metal strip covered with the finishing film.

The roof molding 1 is manufactured by several machines shown in FIG. 3. The metal strip 2 is drawn from a supply roll 2A by a drawing machine 7. The metal strip 2 passes through a guide roll 8 before entering an applicator roll 9 where an adhesive material 10 is varnished to the upper surface of the metal strip 2 (FIG. 4). Subsequent to the application of the adhesive material 10, the metal strip 2 is introduced into a heating unit 11 such as high frequency heating unit where the adhesive material 10 is baked to the upper surface of the metal strip 2. After passing the heating unit 11, a finishing film 3 supplied from a coil 3A is laminated on the adhesive material 10 baked onto the upper surface of the metal strip 2 in such a way that the transparent resin layer 5 forms an outermost layer (FIGS. 5 and 6). It will be noted that the finishing film 3 covers almost all the areas of the surface of the adhesive material 10 except for small areas adjacent to the longitudinal edges of the adhesive material 10.

Figure 7:
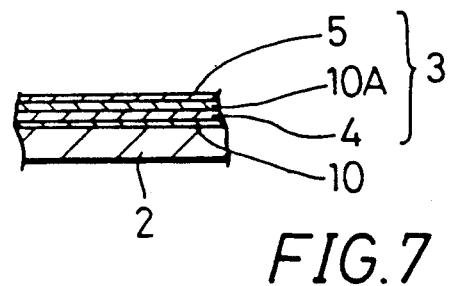
FIG. 7 is an enlarged sectional view taken along the lines VII—VII of FIG. 6.
Figure 8:
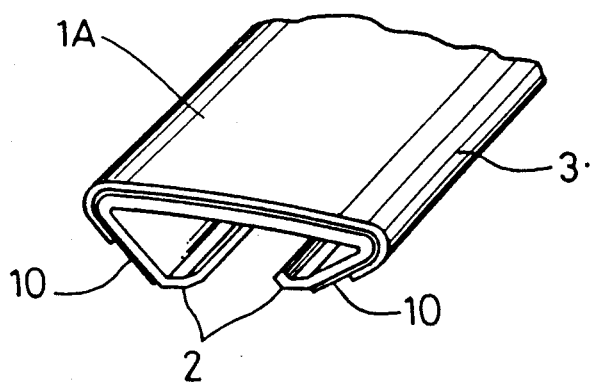
FIG. 8 is a perspective view of the folded metal strip.

The metal strip 2 laminated with the finishing film 3 subsequently passes through a press roll 12 where the finishing film 3 is sufficiently adhered to the adhesive material 10 on the metal strip 2 (FIGS. 6 and 7). Thereafter, the metal strip 2 continues to pass through a roll bender 18 having a plurality of bending rolls where the metal strip 2 is sequentially folded along both of the longitudinal edges thereof in a manner that the finishing film 3 covers the folded portions of the metal strip 2 (FIG. 8). In the folding operation, the finishing film 3 may be folded together with the metal strip 2 without separating from the adhesive material 10 because of its sufficient flexible feature.

After the folding operation at the roll bender 18, the metal strip 2 passes through another heating unit 13 to activate the adhesive material 10 which is not covered with the finishing film 3 prior to entering an extruder 14 where the resilient seal members 6 are formed and bonded to such activated layer of the adhesive material 10. The extruder 14 has a die 14A from which a molten resin such as molten PVC is extruded to form the resilient seal member 6. Such extruding operation to form the resilient seal member 6 does not cause damages to the finishing film 3 provided on the metal strip 2.

Figure 9:
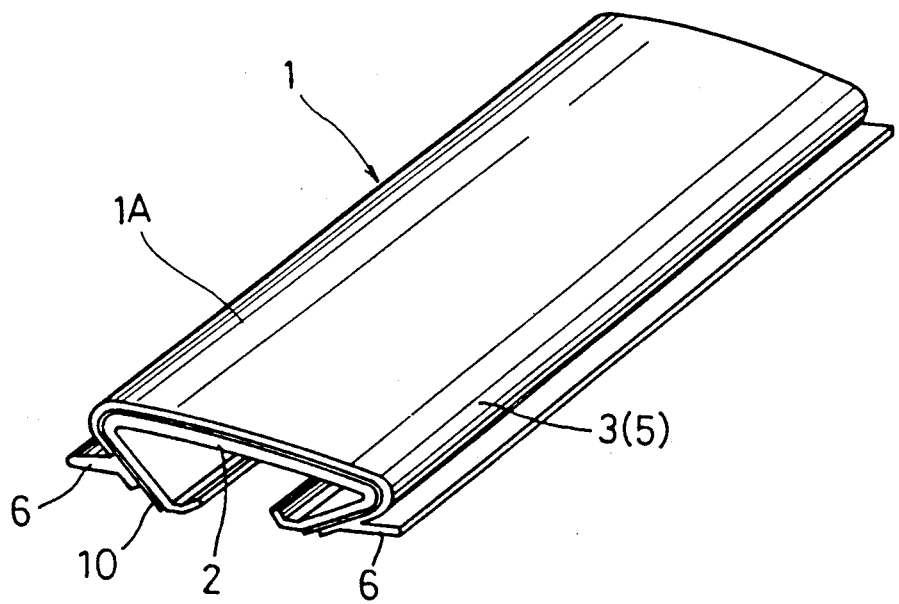
FIG. 9 is a perspective view of the molding before finishing the end portions thereof.
Figure 10:
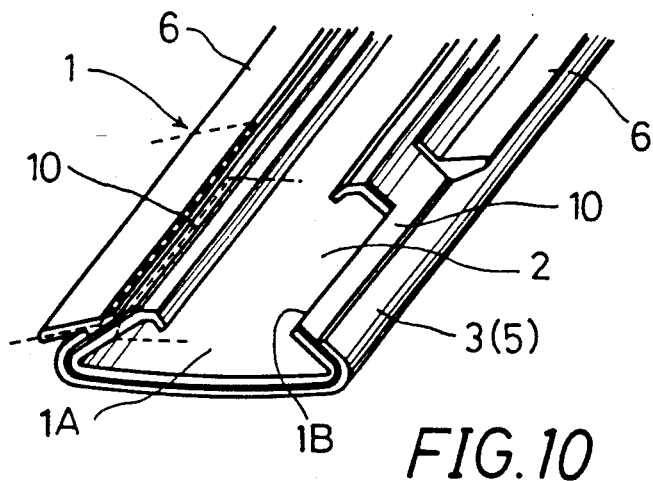
FIG. 10 is a partial perspective view of the molding after the end portion thereof is cut away.
Figure 11:
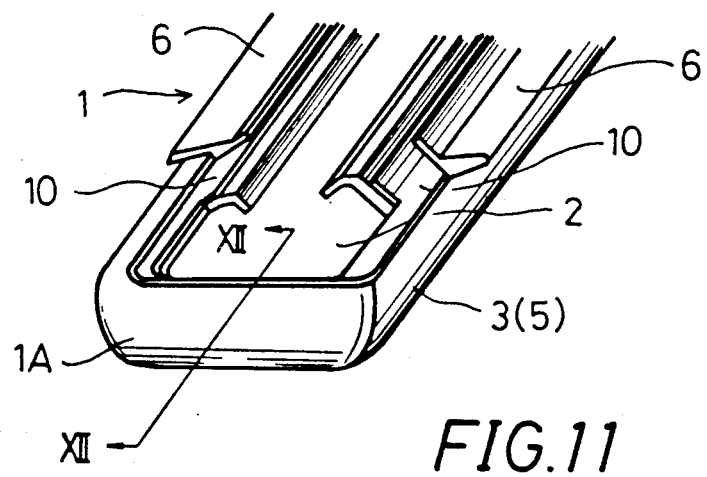
FIG. 11 is a partial perspective view of the molding after the end portion thereof is inwardly folded.

The metal strip 2 formed with the seal members 6 subsequently enters a cooling bath 15 and continues to pass through the drawing machine 7 and to enter a cutting machine 17 where the metal strip 2 is severed to form desired length of strips, thereby forming the roof molding 1 as shown in FIG. 9. The setting of the length of the roof molding 1 is performed by a measuring device 16 positioned between the drawing machine 7 and the cutting machine 17. The roof molding 1 produced through such machines is sent to a stage of treatment procedure of opposite ends thereof.

Figure 12:
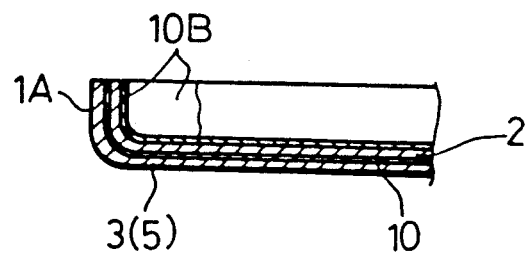
FIG. 12 is a sectional view taken along the line XII—XII of FIG. 11.
Figure 13:
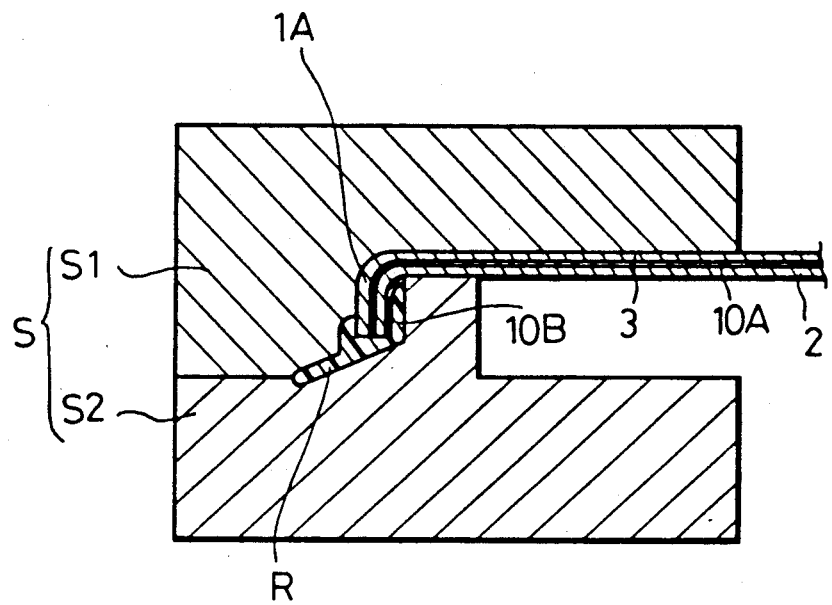
FIG. 13 is a sectional view of the folded molding inserted into a die for forming a resilient seal member.

In the stage of treatment of the end portions of the roof molding 1, the longitudinal edges of the roof molding 1 are partially cut away to form a notch 1B (FIG. 10) before end portion 1A of the roof molding 1 is inwardly folded (FIG. 11) by a press (not shown). In the folding operation of the end portion 1A, the finishing film 3 may be folded together with the metal strip 2 without separating from the adhesive material 10 because of its sufficient flexible feature. Thereafter, the reverse face of the folded end portion 1A is coated with an adhesive material 10B, as shown in FIG. 12, before the end portion 1A is positioned in a molding die S comprising an upper half die S1 and a lower half die S2 which form a cavity R therebetween. Subsequent to this process, a molten resin such as molten PVC is extruded into the cavity R to form the resilient seal member 6A. The end portion 1A is released from the die S after cooling procedure, thereby forming the resilient seal member 6A which extends along the end portion 1A and continues to the resilient seal member 6 provided on the longitudinal edges of the metal strip 2 (FIGS. 1 and 2). It will be noted that another end portion opposite to the end portion 1A is treated in the same way.

Figure 14:
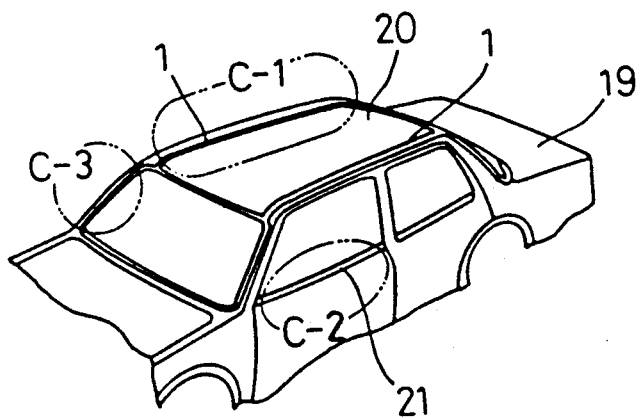
FIG. 14 is a schematic illustration of an automobile showing several portions mounted with the moldings.

The roof molding 1 treated through such treatment procedure of the opposite ends thereof is assembled into fitting groove (not shown) formed on a roof 20 of an automobile 19, as shown by broken line frame C-1 in FIG. 14.

Figure 15:
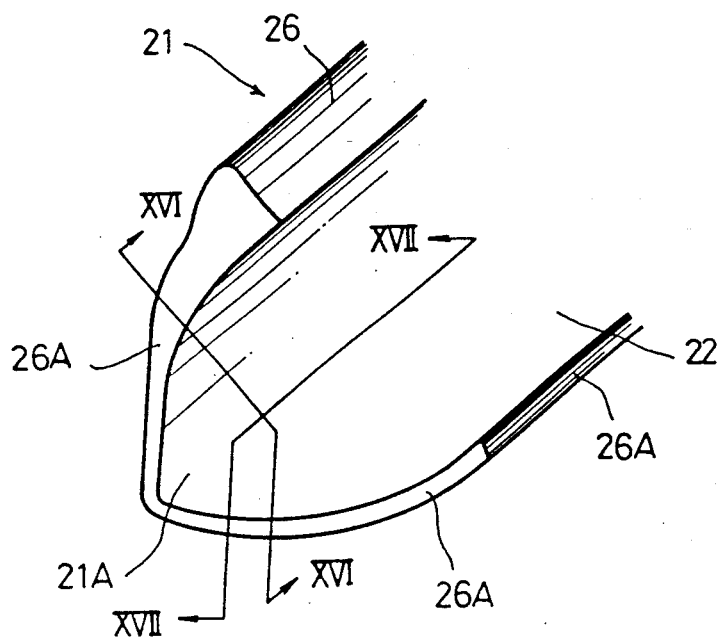
FIG. 15 is a perspective view of a molding according to a second embodiment of the present invention.

Referring now to FIGS. 15 to 23, shown therein is a molding 1 according to a second embodiment of the invention which is applicable to a door of an automobile. For convenience in terminology, the molding 21 for use in automobile doors will be called the door molding. As shown in FIG. 15, the door molding 21 comprises a metal strip 22 folded unsymmetrically in cross section, a flexibile finishing film 23 bonded to the metal strip 22 so as to cover the upper flat surface and the folded surface of the metal strip 22, and resilient seal members or resilient lips 26 provided on and extending along the longitudinal edges of the metal strip 22. An end portion 21A of the door molding 21 is inwardly folded after the longitudinal edge portions of the door molding 21 are partially cut away to form notches 21B (FIG. 23) and is provided with a resilient seal member 26A which is integrally bonded to the resilient seal member 26.

Figure 18:
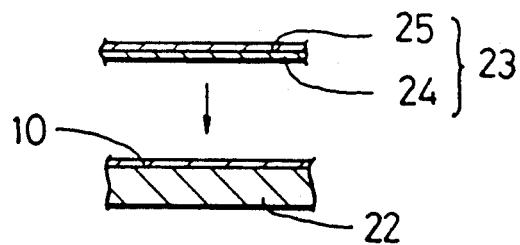
FIG. 18 is a sectional view of finishing film and a metal strip before bonding the film to the metal strip.

As shown in FIG. 18, the flexible finishing film 23 comprises a colored flexible resin film 24 to which a flexible transparent resin layer 25 is directly adhered. In this embodiment, the resin film 24 is formed typically of PVC and is coated with a white painting material, and the transparent resin layer 25 is formed typically of urethane resin.

Figure 19:
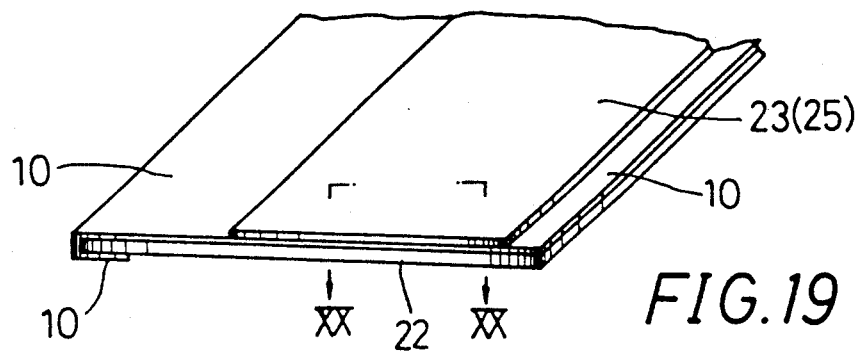
FIG. 19 is a perspective view of the metal strip covered with the finishing film.
Figure 20:
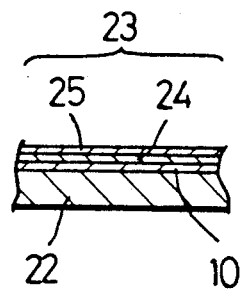
FIG. 20 is sectional view taken along the line XX—XX of FIG. 19.
Figure 21:
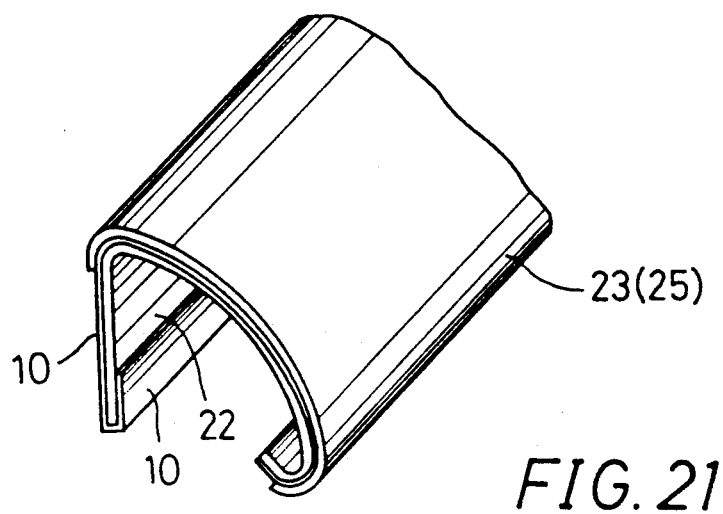
FIG. 21 is a perspective view of the folded metal strip.

The door molding 21 is manufactured by machines similar to those shown in FIG. 3. The metal strip 22 is drawn from a supply roll 2A enters the applicator roll 9 where the adhesive material 10 is varnished to the upper surface, one of side surface and a part of the lower surface of the metal strip 22 (FIG. 19). The construction of the applicator roll 9 is partially modified from that of the applicator roll 9 of the first embodiment so that the adhesive material 10 is applied to the upper surface, one of the side surfaces and a desired part of the lower surface of the metal strip 22. Subsequent to the application of the adhesive material 10, the metal strip 22 is introduced into a heating unit 11 where the adhesive material 10 is baked to the respective surfaces of the metal strip 22. After passing the heating unit 11, a finishing film 23 supplied from the coil 3A is laminated on the adhesive material 10 baked onto the upper surface of the metal strip 22 in such a way that the transparent resin layer 25 forms an outermost layer (FIGS. 19 and 20). It will be noted that the finishing film 23 covers the desired central areas of the adhesive material 10 applied on the upper surface of the metal strip 22. The metal strip 22 subsequently enters the press roll 12 for sufficiently adhering the finishing film 23 to the metal strip 22 (FIGS. 19 and 20). After passing through the press roll 12, the metal strip 22 continues to pass through a roll bender 18 having a plurality of bending rolls where the metal strip 22 is sequentially folded along with both of the longitudinal edges thereof in a manner that the finishing film 23 covers the folded portions of the metal strip 22 (FIG. 21). In the folding operation, the finishing film 23 may be folded with the metal strip 22 without separating from the adhesive material 10 because of its sufficient flexible feature.

After passing through the folding station, the metal strip 22 enters another heating unit 13 to activate the adhesive material 10 which is not covered with the finishing film 23 before entering the extruder 14 where the resilient seal members 26 are formed and bonded to such activated layer of the adhesive material 10. The resilient seal member 26 may be formed of a synthetic resin such as PVC. As apparent from FIG. 22, the resilient seal member 26 is configured to enclose one of the side surface and a part of the lower surface of the metal strip 22, so that the seal member 26 is fixedly connected to the metal strip 22.

Figure 22:
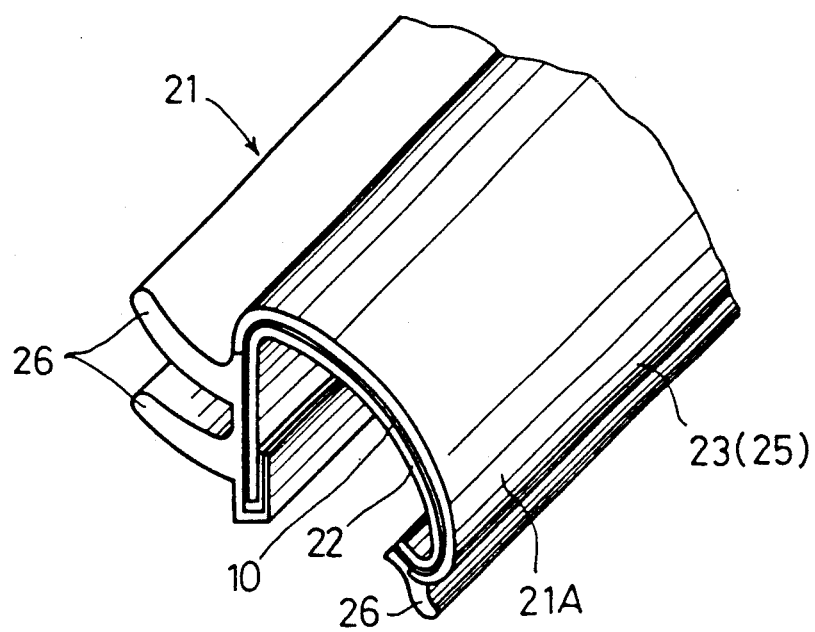
FIG. 22 is a perspective view of the molding before finishing the end portions thereof.
Figure 23:
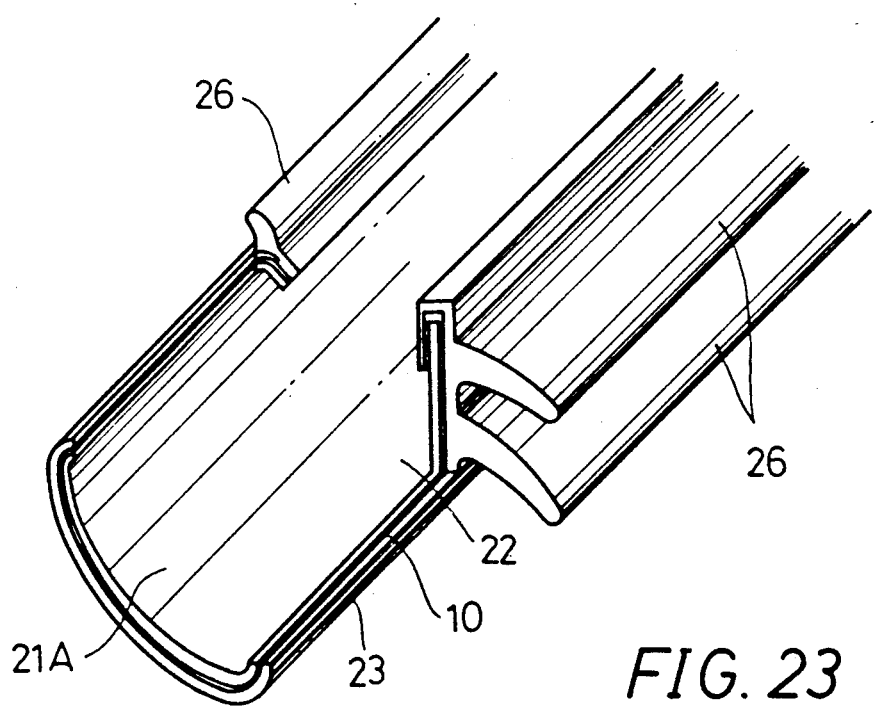
FIG. 23 is a partial perspective view of the molding after the end portion thereof is cut away.
Figure 24:
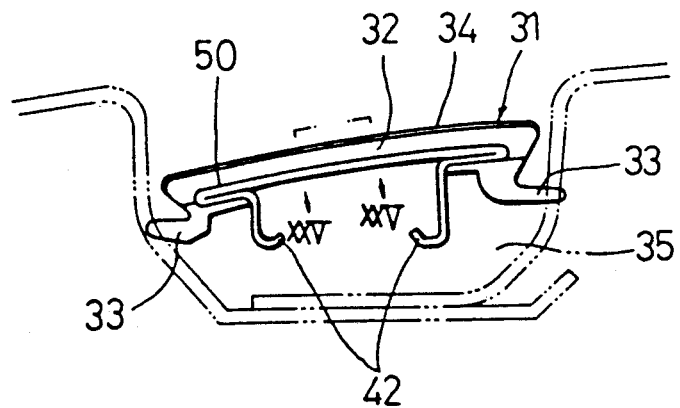
FIG. 24 is a sectional view of a conventional molding.
Figure 25:
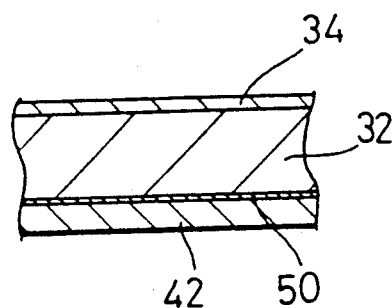
FIG. 25 is an enlarged sectional view taken along the line XXV—XXV of FIG. 24.
Figure 26:
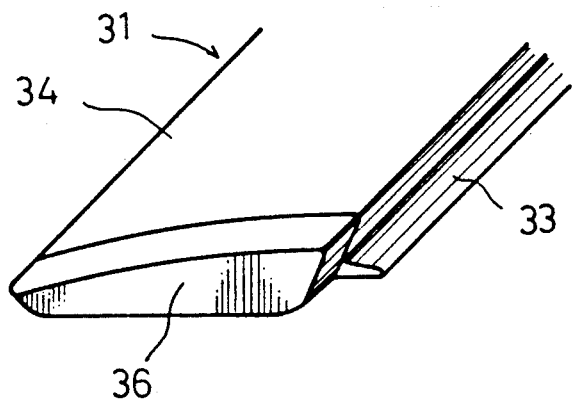
FIG. 26 is a perspective view of the molding provided with an end cap.

The metal strip 22 formed with the seal members 26 subsequently enters the cooling bath 15 and continues to enter the cutting machine 17 where the metal strip 22 is severed to form desired length of strips, thereby forming the door molding 21 as shown in FIG. 22. The setting of the length of the roof molding 21 is performed by the measuring device 16 positioned between the drawing machine 7 and the cutting machine 17. The roof molding 21 produced through such machines is sent to a stage of treatment procedure of opposite ends thereof.

Figure 16:
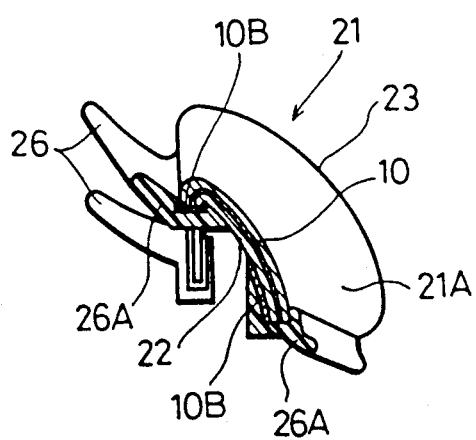
FIG. 16 is sectional view taken along the line XVI—XVI of FIG. 15.
Figure 17:
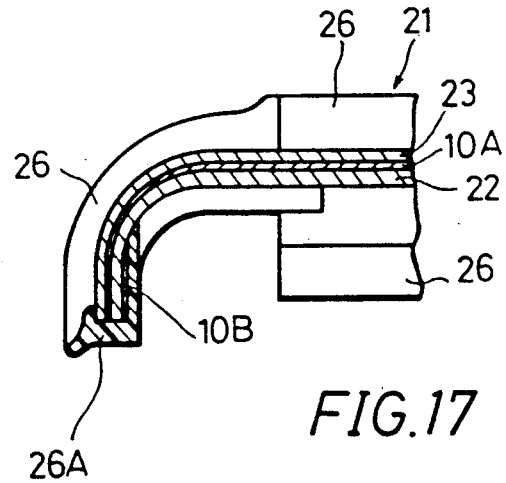
FIG. 17 is sectional view taken along the line XVII—XVII of FIG. 15.

In the stage of treatment of the end portions of the door molding 21, the longitudinal edges of the door molding 21 are partially cut away to form a notches 21B (FIG. 23) before an end portion 21A of the door molding 21 is inwardly folded (FIG. 17) by a press (not shown). In the folding operation of the end portion 21A, the finishing film 23 may be folded together with the metal strip 22 without separating from the adhesive material 10 because of its sufficient flexible feature. Thereafter, the reverse face of the folded end portion 21A is coated with the adhesive material 10B, as shown in FIGS. 16 and 17, before the end portion 21A is positioned in a molding die (not shown) comprising an upper half die and a lower half die which form a cavity therebetween. Subsequent to this process, a molten resin such as molten PVC is extruded into the cavity to form the resilient seal member 26A. The end portion 21A is released from the die after cooling procedure, thereby forming the resilient seal member 26A which extends along the end portion 21A and continues to the resilient seal member 26 provided on the longitudinal edges of the metal strip 22 (FIGS. 15 and 16). It will be noted that another end portion opposite to the end portion 21A is treated in the same way.

The door molding 21 treated through such treatment procedure of the opposite ends thereof is assembled into fitting groove (not shown) formed on a door of the automobile 19, as shown by broken line frame C-2 in FIG. 14.

The preferred embodiments herein described are intended to be illustrative of the inventions and not to limit the inventions to the precise form herein described. They are chosen and described to explain the principles of the invention and their application and practical use to enable others skilled in the art to practice the invention. Accordingly, the invention may be applied to another molding such as a window molding having a weather strip, as shown by broken line frame C-3 in FIG. 14.

What is claimed is:

1. In a molding for use with an automobile comprising an elongated, self-supporting metal strip folded along longitudinal edges thereof to form a structure with a defined height component; a finishing film bonded to said metal strip so as to cover an outwardly disposed surface thereof and the folded edges, said finishing film comprising a flexible resin film and a flexible transparent resin layer on an outwardly disposed surface of the resin film; and resilient seal members bonded to said folded edges;
   an end structure comprising:
   said folded edges cut-away adjacent opposite lateral ends of said molding;
   said metal strip and finishing film folded inwardly at each said opposite lateral end to form closed end portions having substantially said defined height component; and
   an end resilient seal member bonded to each of said closed end portions and continuing said resilient seal members.

2. The end structure of a molding as defined in claim 1, wherein said resilient seal members are formed of polyvinyl chloride.

3. A process for finishing the opposite end portions of a molding for use with an automobile comprising an elongated, self-supporting metal strip folded along the longitudinal edges thereof to form a structure with a defined height component; a finishing film bonded to said metal strip so as to cover an outwardly disposed surface thereof and the folded edges, said finishing film comprising a flexible resin film and a flexible transparent resin layer provided on an outwardly disposed surface of the resin layer; and resilient seal members bonded to said folded edges, comprising the steps of:

partially cutting away the folded edges adjacent opposite lateral ends of the molding;

inwardly folding said metal strip and finishing film at each said opposite lateral end of the molding to form closed end portions having substantially said defined height component;

varnishing an adhesive material to each of said closed end portions; and forming a resilient seal member to each of said closed, varnished end portions.

4. The process as defined in claim 3, wherein said step of folding is performed by a press.

5. The process as defined in claim 4, wherein said step of forming a resilient seal member includes the steps of positioning each of the end portions of the molding in a molding die and extruding a molten resin into said molding die.

* * * * *